United States Patent [19]

Wehrli et al.

[11] 3,869,452

[45] Mar. 4, 1975

[54] 14BETA,18-(EPOXYETHANOIMINO) STEROIDS

[75] Inventors: Hansuli Wehrli, Schaffhausen; Oskar Jeger, Zollikerberg/Zurich, both of Switzerland

[73] Assignee: Ciba-Geigy Corporation, Ardsley, N.Y.

[22] Filed: Oct. 19, 1972

[21] Appl. No.: 298,913

Related U.S. Application Data

[63] Continuation of Ser. No. 82,183, Oct. 19, 1970, abandoned.

[30] Foreign Application Priority Data

Oct. 24, 1969 Switzerland....................... 15902/69

July 24, 1970 Switzerland....................... 11242/70

[52] U.S. Cl................260/239.55 R, 260/239.55 C, 260/397.4, 260/397.45, 260/397.5, 260/999

[51] Int. Cl.......................................... C07c 173/10

[56] References Cited

OTHER PUBLICATIONS

Tobuysma et al. I J.A.C.S. Vol. 90 pages 1917 – 1918 (1968).

Tobuyama et al. II J.A.C.S. Vol. 91 pages 3931– 3938 (1969).

*Primary Examiner*—Henry A. French
*Attorney, Agent, or Firm*—Joseph G. Kolodny; Ronald A. Daignault; John J. Maitner

[57] ABSTRACT

Compounds of the class of 14$\beta$,18-(epoxyethanoimino)-pregnane derivatives and their pharmceutically acceptable acid addition salts have cardiotonic activity and are active ingredients of pharmaceutical compositions; a typical embodiment is 1'-methyl-2'-oxo.3$\beta$,20$\xi$-diacetoxy-14$\beta$,18-(epoxyethanoimino)-5$\alpha$,17$\alpha$-pregane.

14 Claims, No Drawings

14BETA,18-(EPOXYETHANOIMINO) STEROIDS

This is a continuation of application Ser. No. 82,183, filed October 19, 1970 now abandoned.

The present invention relates to derivatives of 14β,18-(epoxyethanoimino)-pregnanes and pharmaceutically acceptable acid addition salts thereof with useful pharmacological activity and to pharmaceutical compositions containing them.

More particularly, the present invention relates to compounds of the formula I

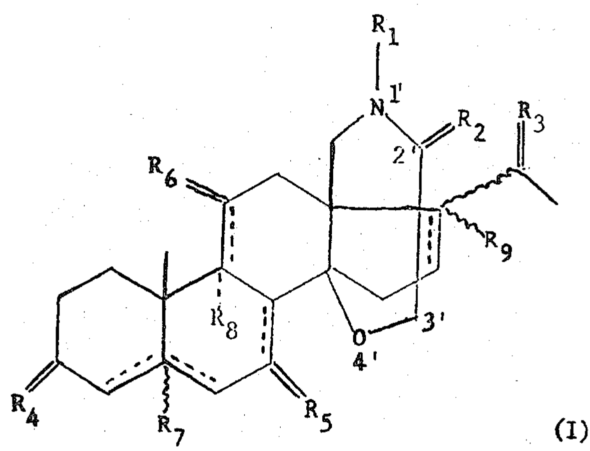

wherein:

$R_1$ represents a lower alkyl group, the benzyl group or hydrogen, $R_2$ represents an oxo radical or two hydrogen atoms, $R_3$ represents a free or protected oxo radical, or a free, esterified or etherified hydroxyl group and a hydrogen atom, $R_4$ represents a free or protected oxo radical, or a free, esterified or etherified hydroxyl group and a hydrogen atom, or a free or etherified hydroxyl group and together with $R_8$ an epoxy radical, $R_5$ and $R_6$ each independently represent a free or protected oxo radical, or a free, esterified or etherified hydroxyl group and a hydrogen atom, or two hydrogen atoms, or, when occurring at a double bond, one hydrogen atom.

$R_7$ represents an α- or β-oriented hydrogen atom, $R_8$ represents an α-oriented hydrogen atom, an α-oriented hydroxyl group, or together with $R_4$ an epoxy radical, and $R_9$ represents an α- or β-oriented hydrogen atom, or a free, esterified or etherified hydroxyl group, whereby double bonds may be present in the positions 5 or 4, when $R_4$ represents a free oxo radical, as well as 7, 9 (11) and 16 corresponding to the dotted lines with the elimination of $R_7$, $R_8$ and/or $R_9$, as well as to pharmaceutically acceptable acid addition salts of the compounds of formula I in which $R_2$ designates two hydrogen atoms.

As lower alkyl group, $R_1$ is, e.g. a methyl group, an ethyl group, an n-propyl group, an isopropyl group, a butyl group or pentyl group. The afore-mentioned esterified hydroxyl groups in 20-position are derived from lower alkanoic acids such as: acetic acid, propionic acid, butyric acid, isobutyric acid, valeric acid, isovaleric acid, pivalic acid or formic acid; or from pyrrole carboxylic acids and alkyl-substituted pyrrole carboxylic acids such as 2,4,5-trimethylpyrrole-3-carboxylic acid, 2,4-dimethylpyrrole-3-carboxylic acid or 2-ethyl-4-methylpyrrole-3-carboxylic acid. Esterified hydroxyl groups in the positions 3, 7 and/or 11 are derived from lower alkanoic acids, e.g. from the aforementioned lower alkanoic acids.

Suitable etherified hydroxyl groups in the 3-, 20-, 7-, 11- and/or 17-positions are, in particular, those which are derived from lower alkanols such as methyl alcohol, ethyl alcohol, propyl alcohol, isopropyl alcohol, or from the butyl or amyl alcohols. Suitable as etherified hydroxyl group are, for example, also the (tetrahydro-2H-pyran-2-yl)-oxy group, the 4-methoxy-tetrahydropyran-4-yloxy group and the 1,1-methoxy-cyclohexyl-1-yloxy group, as well as the benzyloxy group and the triphenyl-methoxy group. Protected oxo radicals in the 3-, 20, 7- and/or 11-positions are ketal groupings which are derived from lower alkane-diols or from lower alkanols.

The compounds of the general formula I possess valuable pharmacological properties. They selectively raise the permeability of muscle and nerve membranes for sodium ions. The resulting increase of influx of sodium ions causes an acceleration of depolarization and thus also of muscle contraction. Since according to recent evidence cardio-active substances of the digitalis-strophanthin type hinder the transfer of active sodium ions out of the muscle fibers by blocking the transferadenosin triphosphate ase of the membranes thus likewise increasing the sodium concentration, and accelerating depolarization and muscle contraction, the compounds of general Formula I lead ultimately, via the different mechanism already mentioned, to therapeutic effects which are similar to those of the cardio-active digitalis substances, such as strengthening of the systole and of the minute volume of the heart.

In addition, the compounds of general Formula I in which $R_2$ represents the oxo radical are new intermediate products for the production of the pharmacologically more important compounds of general Formula I having 2 hydrogen atoms as $R_2$. However, also the latter compounds of general Formula I, in particular those having a free hydroxyl group in 20-position, can be used as intermediate products for the production of other pharmacologically valuable substances. Of particular importance as new pharmacologically active substances and as intermediate products therefor are the compounds of the general Formula Ia

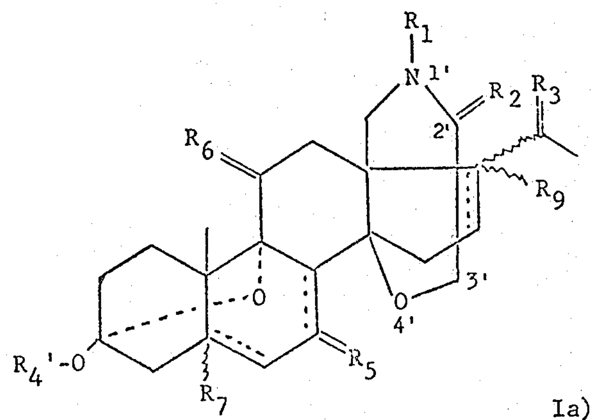

wherein:

$R_4'$ represents a lower alkyl group or the benzyl group.

and $R_1$, $R_2$, $R_3$, $R_5$, $R_6$, $R_7$ and $R_9$ have the meaning given for Formula I, whereby double bonds may be present in the positions 5, 7 and 16 corresponding to the dotted lines, with the elimination of $R_7$ and $R_9$ accordingly.

The compounds of general Formula Ia in which $R_2$ represents the oxo radical are particularly important as intermediate products for the compounds of general Formula Ia having two hydrogen atoms as $R_2$. The latter compounds can also be used as intermediate products; e.g. they can be converted into the corresponding semiketals, i.e. compounds having a free 3β-hydroxy group. These and other modifications of the compounds of general Formulas I and Ia are described more in detail further below.

The process for the production the compounds of general Formula I of the present application is characterized in that a compound of the general Formula II

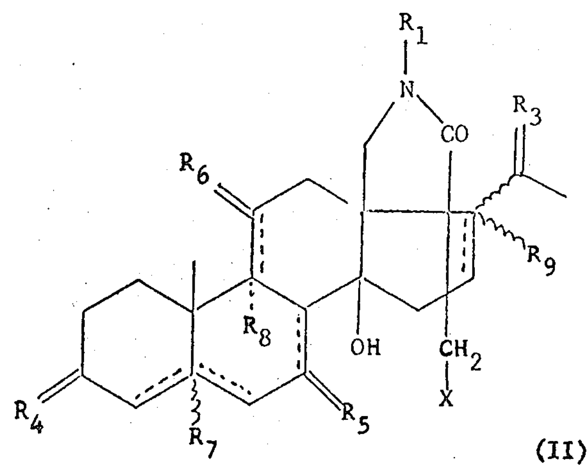

wherein:

X represents a halogen atom such a chlorine, bromine or iodine, and $R_1$, $R_3$, $R_4$, $R_5$, $R_6$, $R_7$, $R_8$ and $R_9$ have the meaning given for Formula I, and the double bonds mentioned there can be present, is cyclized in the presence of an acid-binding agent in a solvent which is inert and/or one containing a hydroxyl group; if desired, the lactam grouping is then reduced by means of a complex hydride to a cyclic amino group; and/or esterified hydroxyl groups in $R_3$, $R_4$, $R_5$ and/or $R_6$, protected oxo radicals, or an etherified hydroxyl group occurring together with an epoxy radical in $R_4$ are set free; and/or free oxo radicals $R_3$, $R_4$, $R_5$ and $R_6$ are reduced; and/or free hydroxyl groups in $R_3$, $R_4$, $R_5$ and $R_6$ are oxidized to oxo radicals, or esterified, or etherified; and/or, if desired, compounds of general Formula I in which $R_2$ denotes two hydrogen atoms, are converted into acid addition salts with inorganic or organic acids.

For the cyclization according to the process of the compounds of the above general Formula II, metal hydroxides are preferably used as acid-binding agents, such as: silver hydroxide, sodium or potassium hydroxide solution, basic metal salts such as sodium and potassium carbonate, or sodium and potassium bicarbonate, alkali metal alcoholates such as, e.g. sodium methylate, sodium ethylate or potassium-tert.butylate, metal hydrides such as sodium hydride, calcium hydride or lithium aluminium hydride. The solvents used for the reaction according to the process are, preferably, aliphatic, cyclic or aromatic hydrocarbons, especially benzene or toluene, ethers such as, e.g. diethyl ether, tetrahydrofuran, dioxane, or also dimethylsulphoxide, dimethylformamide and/or alcohols such as, e.g. methanol, ethanol or tert. butanol. An advantageous embodiment of the cyclization is the reaction of the starting materials with sodium hydride in a mixture, preferably 1:1, of benzene and tetrahydrofuran in the presence of catalytic amounts of an alcohol, especially methanol or ethanol.

The lactams obtained after cyclization and which are embraced by the general Formula I, in which lactams $R_2$ is an oxo radical, can be converted according to the process by reduction into the corresponding cyclic amines in which $R_2$ denotes two hydrogen atoms, and/or modified at the 20-oxygen group, and, when present, at the oxygen groups in the positions 3, 7 and/or 11, in a known manner. Thus, for example a lactam embraced by the general Formula I may be converted by treatment with a complex hydride, such as lithium aluminium hydride, in an ether such as diethyl ether, tetrahydrofuran or dioxane, into the corresponding cyclic amine.

By the reduction with lithium aluminium hydride, the esterified hydroxyl groups are also set free. When the lactams are not reduced in this manner, the hydroxyl groups can be set free, e.g., by alkaline hydrolysis. Oxo radicals protected by ketal groupings can be set free by treatment with acids under mild conditions, e.g. with mixtures of 70% aqueous perchloric acid and glacial acetic acid at room temperature. Under the same conditions, an alkoxy group in 3β-position together with a 3α,9α-epoxy radical is converted into the hydroxyl group. Free oxo radicals can be reduced to hydroxyl groups, e.g., by means of complex hydrides such as sodium boro-hydride or tri-tert-butoxy-lithium aluminium hydride, e.g. in tetrahydrofuran. Free hydroxyl groups can be oxidized to oxo groups, either before or following reduction of the lactam group, by means of the Oppenauer reaction or with the aid of compounds of 6-valent chromium, e.g. chromium trioxide in pyridine.

Hydroxyl groups can be esterified in a known manner, e.g. by treatment with an acid halide or acid anhydride derived from a lower alkanoic acid or from an optionally alkyl-substituted pyrrole carboxylic acid, in the presence of a tertiary base such as pyridine. Etherification with lower alkanols is effected, e.g. by treatment of the mono- or polyhydroxy compounds embraced by the general Formula I with a reactive ester of the respective alkanol, especially with a hydrogen halide ester, thus, for example, with a lower alkyl halide, in the presence of a base, such as an alkali hydride or alkali hydroxide.

The compounds of general Formula II to be used as starting materials can, in turn, be obtained by a. partial alkaline hydrolysis of a compound of the general Formula III

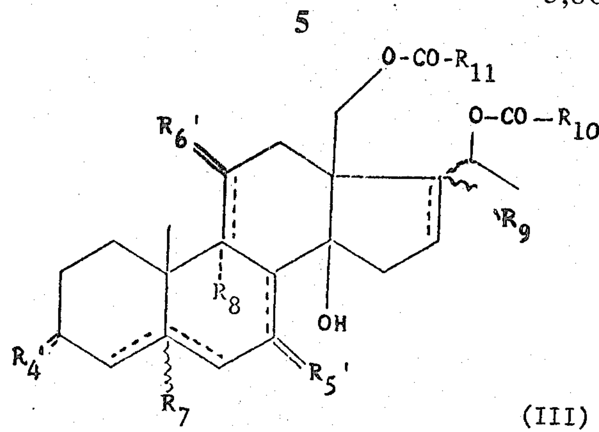

wherein:

$R_4'$ represents a protected oxo radical, an esterified or etherified hydroxyl group and a hydrogen atom, or an etherified hydroxyl group and together with $R_8$ an epoxy radical, or two hydrogen atoms, $R_5'$ and $R_6'$ each independently represent a protected oxo radical, an esterified or etherified hydroxyl group and a hydrogen atom, or two hydrogen atoms, or, when occurring at a double bond, one hydrogen atom, $R_7$ represents an $\alpha$- or $\beta$-oriented hydrogen atom, $R_8$ represents an $\alpha$-oriented hydrogen atom, an $\alpha$-oriented hydroxyl group, or together with $R_4'$ an epoxy radical, $R_9$ represents an $\alpha$- or $\beta$-oriented hydrogen atom, or an esterified or etherified hydroxyl group, and $R_{10}$ and $R_{11}$ each independently represent lower alkyl groups, hydrogen, or the phenyl group, whereby double bonds may be present in the positions 5, 7, 9 (11) and 16 corresponding to the dotted lines with the elimination of $R_7$, $R_8$ and/or $R_9$, in order to cleave off the acyl group —CO—$R_{11}$;

b. oxidizing the compound obtained of the general Formula IV

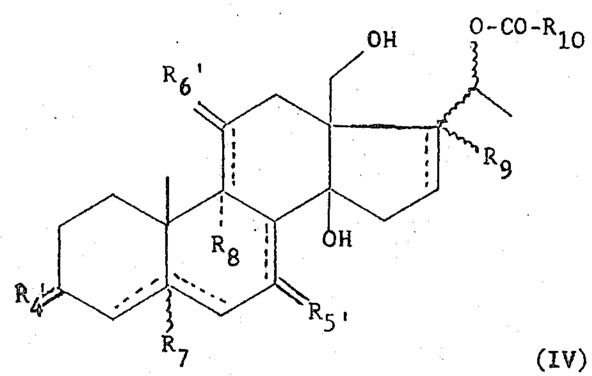

to convert the 18-hydroxy group into the 18-oxo radical;

c. reacting the oxidation product of the general Formula V

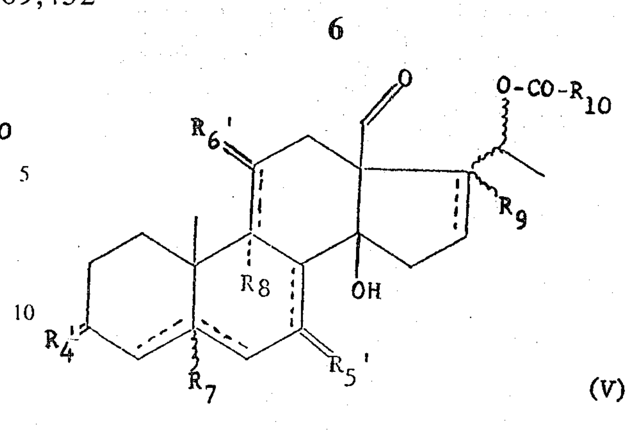

with a compound of the general Formula VI $$H_2N - R_1 \quad \text{(VI)}$$

wherein $R_1$ has the meaning given for Formula I, and optionally then acylating the hydroxyl groups in $R_4'$, $R_5'$ and $R_6'$ which have been set free or reintroducing the acyl group —CO—$R_{10}$;

d. then reducing the reaction product of the general Formula VII

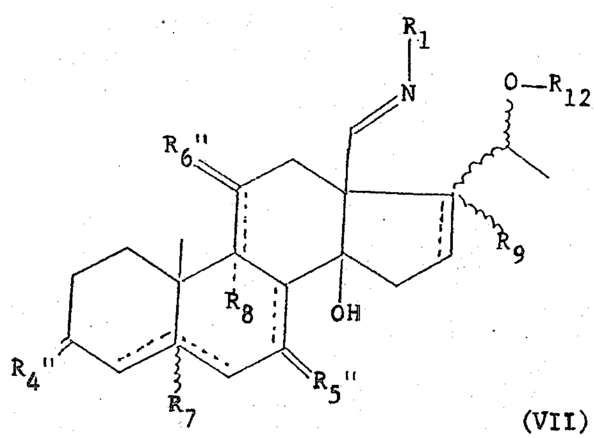

wherein:

$R_4''$, $R_5''$ and $R_6''$, respectively, with the exception of the free oxo radical, $R_{12}$ represents the acyl group —CO—$R_{10}$ or hydrogen, and $R_1$, $R_7$, $R_8$ and $R_9$ have the meaning given for Formula I, by means of a complex hydride to a compound of the general Formula VIII

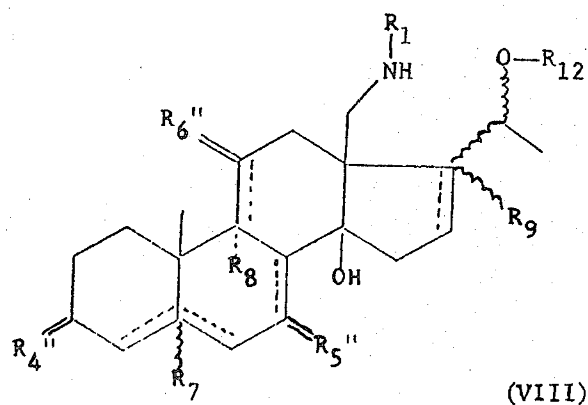

e. reacting the compound of the general Formula VIII with the equimolar amount or, when there are no secondary hydroxyl groups present, also with an excess of a reactive functional derivative of a halogeno-acetic acid in the presence of an acid-binding agent to obtain a compound of general Formula II, and f. optionally, before or after the halogeno-acetylation according to (e), setting free by mild acid hydrolysis, protected oxo radicals and/or a 3$\beta$-alkoxy group adjacent to a 3$\alpha$,9$\alpha$-epoxy radical.

The partial hydrolysis, step (a) of the above-defined reaction sequence, is preferably performed by reacting the compound of general Formula III with about the equimolar or equivalent amount of a basic substance in an organic or organic/aqueous solvent at temperatures between about 20° and 120°C or the boiling temperature of the reaction medium. For example, the compound of general Formula III is heated or boiled for a short period with about an equivalent amount of sodium, potassium or lithium bicarbonate in alkanolic-/aqueous solution, e.g. in hydrous methanol or ethanol; or a compound of general Formula III is reacted at room temperature or with heating with the equimolar amount of an alkali metal alkoxide, e.g. with sodium methoxide in a lower alkanol such as methanol, ethanol or butanol. Weakly basic reagents such as the aforementioned alkali bicarbonates can also be used in excess when the temperature and length of the reaction are so chosen that when the hydrolysis is interrupted, only the 18-hydroxyl group has been set free. Suitable as acyl groups $-CO-R_{10}$ and $-CO-R_{11}$ are, e.g., acetyl, formyl, propionyl, butyryl, isobutyryl, valeryl, isovaleryl, pivaloyl or benzoyl groups. The two acyl groups may be identical or different, but in the latter case $-CO-R_{11}$ should be more readily split off than $-CO-R_{10}$, e.g. an acetyl group or formyl group together with a pivaloyl or benzoyl group as $-CO-R_{10}$.

The possibility of partially hydrolyzing the polyacyloxy compound of general Formula III in order to protect the 20-hydroxyl group during the subsequent oxidation of the 18-hydroxyl group which has been set free, is an important prerequisite for the success of the entire reaction sequence leading from the compounds of general Formula III to the compound of general Formula II and thus also for the production of the final products of general Formula I. That the compounds of general Formula III could be partially hydrolyzed, was in no way predictable, for according to A. L. Nussbaum, F. E. Carlon, E. P. Oliveto, E. Townley, P. Kabasakalian and D. H. R. Barton, Tetrahedron 18 (1962), 373–378, especially the upper part of page 375, the selective protection of one or the other of the two hydroxyl groups in the positions 18 and 20 in 18,20$\beta$-dihydroxy-4-pregnen-3-one is not possible.

The oxidation according to step (b), in which the 18-hydroxy group is converted into the oxo radical thus forming an aldehyde group, can be performed e.g. by means of a 6-valent chromium compound, e.g. with a slight excess of a solution of chromium trioxide in hydrous sulphuric acid in acetone as reaction medium in the cold, furthermore also with chromium trioxide in pyridine. When ketal groups and/or a 3$\beta$-alkoxy group together with a 3$\alpha$, 9$\alpha$-epoxy radical are present, special care should be taken, when using chromium trioxide/sulphuric acid solutions, to maintain a low temperature, preferably at or below 0°C.

The reaction of the compounds of geneal Formula V according to step (c) with a compound of general Formula VI such as methylamine, ethylamine, n-propylamine, isopropylamine, n-butylamine, isobutylamine, benzylamine or ammonia, takes place e.g. at temperatures between about 80° and 150°C in an inert organic solvent such as benzene, toluene, methanol, ethanol or butanol, and if necessary in a closed vessel, depending on the boiling point of the compound of general Formula VI and of the solvent as well as on the reaction temperature. The compound of general Formula VI is preferably used in excess and can optionally be used as sole reaction medium. In the reaction according to the process, aminolysis of acyloxy groups which readily split off also occurs. The hydroxyl groups which have been set free are then optionally again acylated in the same manner as given for the hydroxyl groups of the end products, for example with an acetanhydride/-pyridine mixture at room temperature. If desired, the hydroxyl group which has been set free can be left free, since it is not necessarily affected in the following steps of the process.

The following reduction, step (d), of the imino compounds of general Formula VII is e.g. performed with sodium boro-hydride in aqueous methanol at temperatures between about 0° and 70°C, preferably at room temperature.

For the introduction of the halogeno-acetyl group into the secondary or primary 18-amino group, step (e), for example, a halogeno-acetyl halide or halogenoacetanhydride, such as chloro-acetyl chloride, bromoacetyl chloride, bromo-acetyl bromide, chloroacetanhydride, bromo-acetanhydride, in an inert organic solvent, e.g. a hydrocarbon or halogenated hydrocarbon such as benzene or chloroform, is employed, whereby there is added as acid-binding agent, e.g., an aqueous alkali-metal hydroxide solution as second phase, as well as a solid inorganic basic substance such as potassium or sodium carbonate, or an organic base such as N-ethyl-diisopropylamine, triethylamine, sym. collidine or pyridine. The reaction is preferably performed at temperatures between 0° and about 60°C, whereby an excess of halogeno-acetylating agent should be avoided when there is a free secondary hydroxyl group and/or a free 3$\beta$-hydroxyl group as part of a cyclic hemiketal grouping together with the 3$\alpha$,9$\alpha$-epoxy radical present.

Conditions for the setting free of oxo radicals and/or cyclic hemiketal groupings according to step (f) were already mentioned for the subsequent modifications of the compounds of general Formula I.

Ketal groupings such as ethylene-dioxy groups can also be cleaved, e.g., by heating with the appropriate starting materials in mixtures of a small amount of hydrochloric acid with methanol and acetic acid to about 50° to 70°C.

Compounds of general Formula III can be produced from various known starting materials by reaction sequences which—with isolated exceptions—are known. Two examples of such reaction sequences are given below.

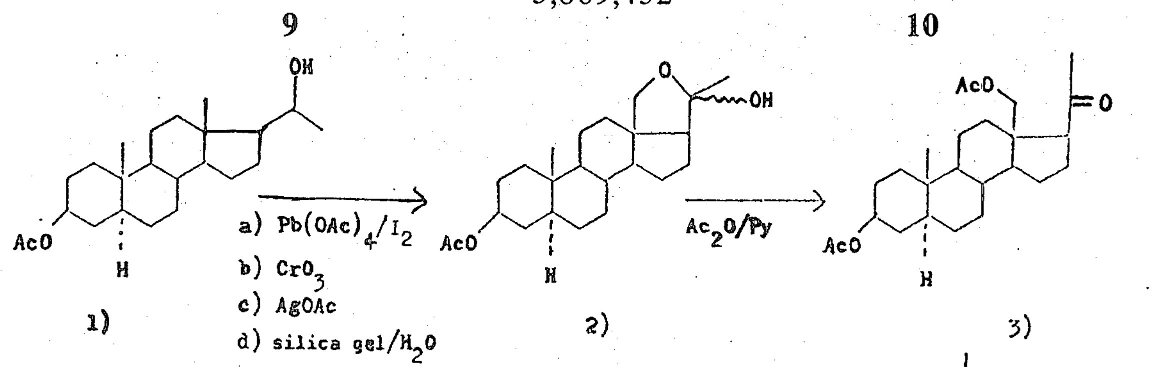
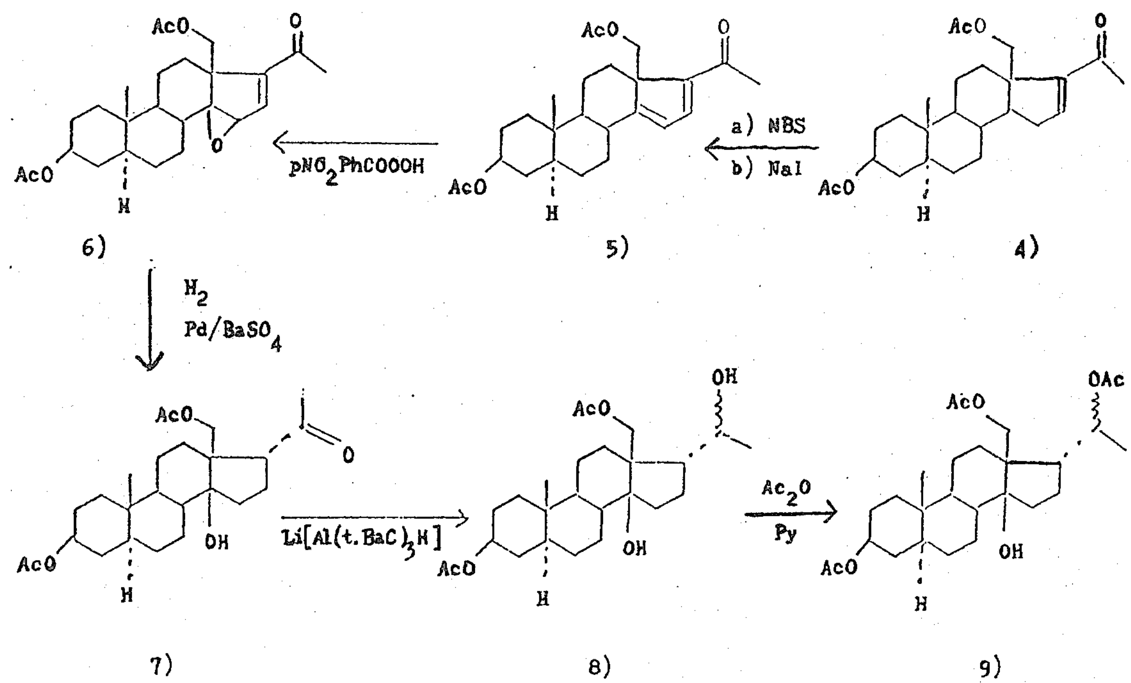
embraced by formula III
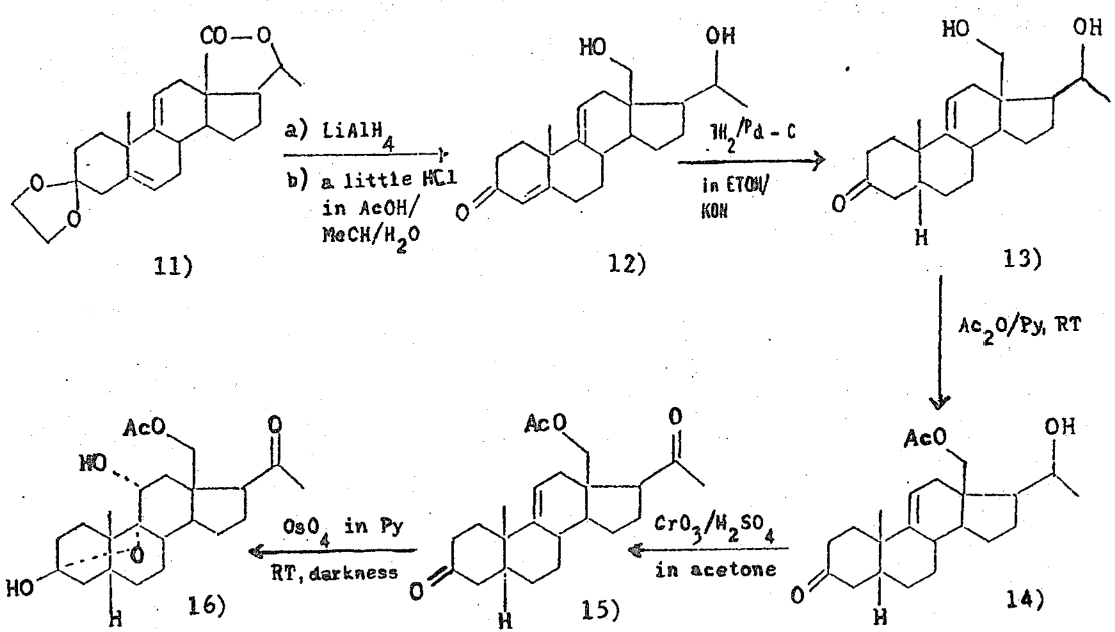

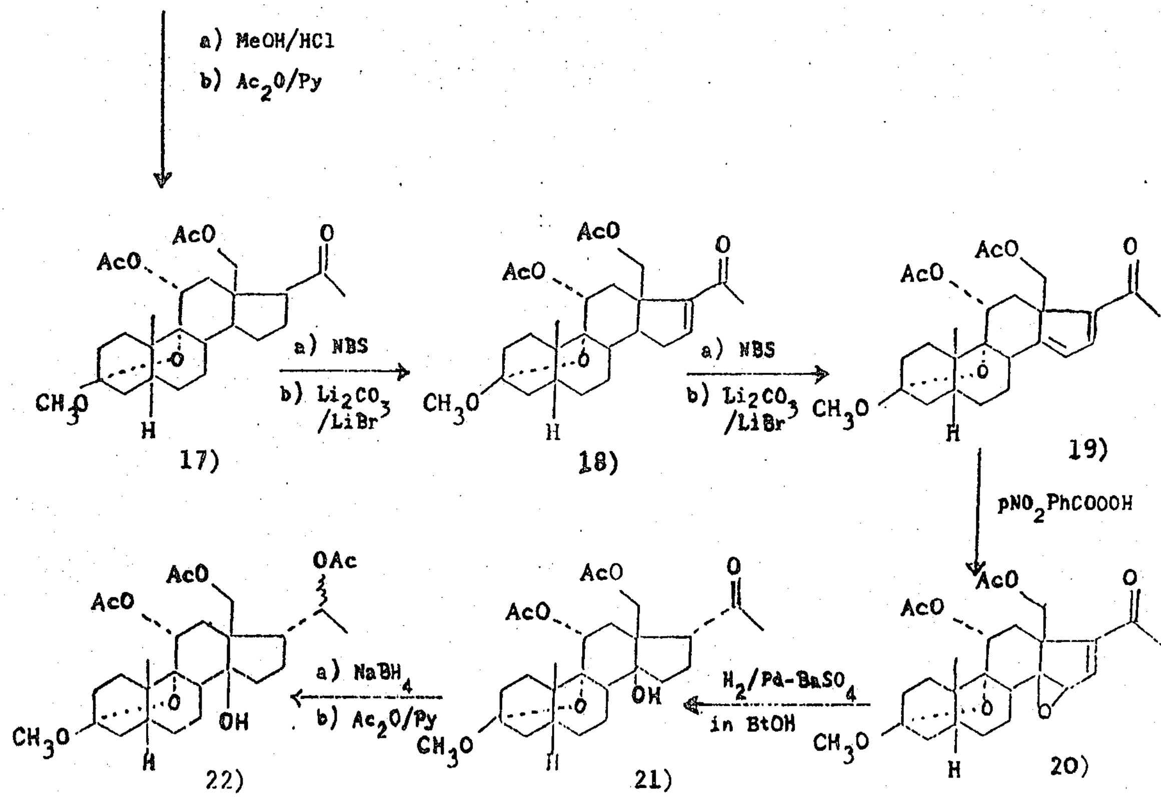

embraced by formula III

According to the first reaction sequence, the starting compound is 3β-acetoxy-20β-hydroxy-5α-pregnane (1), which can be substituted as defined. Compounds of this type are described in the literature. By oxidation with lead tetraacetate in the presence of iodine in cyclohexane, and re-oxidation with $CrO_3$, and subsequent reaction with silver acetate followed by an aftertreatment with silica gel/water, is obtained 3β-acetoxy-18,20-oxido-20 ξ-hydroxy-5α-pregnane (2). Treatment of (2) with acetic anhydride/pyridine, at elevated temperature, yields 3β,18-diacetoxy-20-oxo-5α-pregnane (3), which can be converted by bromination with pyridimium hydrobromideperbromide and subsequent dehydrobromination with dimethyl formamide into 3β,18-diacetoxy-20 -oxo-$\Delta^{16}$-5α-pregnene (4). A repeated bromination with N-bromo-succinimide and dehydrobromination with sodium iodide in acetone yield 3β,18-diacetoxy-20-oxo-$\Delta^{14,16}$-5α-pregnadiene (5). Epoxidation with p-nitroperbenzoic acid yields 3-β,18-diacetoxy-14β,15β-epoxy-20-oxo-$\Delta^{16}$-5α-pregnene (6), which is converted by catalytic hydrogenation in ethanol, in the presence of palladium on barium sulphate, into 3β,18-diacetoxy-14β-hydroxy-20-oxo-5α,17α-pregnane (7). Reduction with lithium-aluminiumtritert.butoxyhydride subsequently leads to 3β,18-diacetoxy-14β,20 ξ-dihydroxy-5α,17α-pregnane (8), which can be acetylated to 3β,18,20 ξ-triacetoxy-14β-hydroxy-5α,17α-pregnane (9). The latter is embraced by the general Formula III.

In the second reaction sequence, the starting compound, (20R)-3-ethylenedioxy-20-hydroxy-$\Delta^{5,9(11)}$-pregnadien-18-acid lactone-( →20) (11), which is also known, is first reduced with lithium aluminium hydride to the 18,20-dihydroxy compound. The subsequent cleaving of the 3-ethylenedioxy group with a little hydrochloric acid in acetic acid/methanol leads to (20R-)-3-oxo-18,20-dihydroxy-$\Delta^{4,9(11)}$-pregnadiene (12), which is hydrogenated with the calculated amount of hydrogen in the presence of a palladium/charcoal catalyst to (20R)-3-oxo-18,20-dihydroxy-$\Delta^{9(11)}$-5β-pregnene (13). Partial acetylation thereof with acetanhydride/pyridine at room temperature leads to (20R)-3-oxo-18-acetoxy-20-hydroxy-$\Delta^{9(11)}$-5β-pregnene (14), which is oxidized with chromium trioxide/sulphuric acid in acetone to 3,20-dioxo-18-acetoxy-$\Delta^{9(11)}$-5β-pregnene (15). On treatment of the latter with osmium tetroxide in pyridine at room temperature and darkness, after several days there is surprisingly obtained 3β,11α-dihydroxy-3α,9α-epoxy-18-acetoxy-20-oxo-5β-pregnane (16). This is in contrast to the statement made by L. F. Fieser in "Steroids", Reinhold Publishing Corporation, New York, 1959, page 669, according to which $\Delta^{9(11)}$-5β-steroids cannot be reacted with osmium tetroxide.

The cyclic hemiketal (16) is first converted with methanolic hydrogen chloride to the ketal and then acetylated with acetanhydride/pyridine to obtain 3β-methoxy-3α,9α-epoxy-11α,18-diacetoxy-20-oxo-5β-pregnane (17). On bromination with N-bromo-succinimide in 17-position and cleaving hydrogen bromide by means of lithium carbonate/lithium bromide, 3β-methoxy-3α,9α-epoxy-11α,18-diacetoxy-20-oxo-$\Delta^{16}$-5β-pregnene (18) is obtained. Repetition of the two latter reactions yields 3β-methoxy-3α,9α-epoxy-11α,18-diacetoxy-20 -oxo-$\Delta^{14,16}$-5β-pregnadiene (19). Treatment thereof with p-nitro-perbenzoic acid in chloroform/methanol leads to 3β-methoxy-3α,9α:14β,15β-diepoxy-11α,18-diacetoxy-20-oxo-$\Delta^{16}$-5β-pregnene (20), from which, by thorough hydrogenation in the presence of palladium/barium sulphate catalyst in ethanol, 3β-methoxy-3α,9α-epoxy-11α,18-diacetoxy-14β-hydroxy-20-oxo-5β,17α-pregnane (21) is obtained. This is finally converted by reduction with sodium boro-hydride in methanol/water and subsequent acetylation with acetanhydride/pyridine into 3β-methoxy-3α,9α-epoxy-11α,18,20 ξ-triacetoxy-14β-hydroxy-5β,17α-pregnane (22), which is embraced by the general Formula III.

The above reaction sequences can also be performed analogously with compounds which instead of the 3-acetoxy or 3-ethylene-dioxy group have other protected hydroxyl groups or oxo radicals falling under the definition for $R_4$.

Analogous to the second reaction sequence, the starting materials having a protected functional group corresponding to the definition of $R_5'$ in 7-position can also be converted into compounds of general Formula III, whereby the functional group in 7-position can be left or can be used to introduce a double bond into the 7,8-position. It is, e.g., likewise possible to reintroduce a double bond into the 16,17-position analogously to the conversion of the compound (17) into the compound (18) in the second reaction sequence.

The invention relates also to those embodiments of the process for the conversion of compounds of general Formula II into those of general Formula I as well as for the reaction sequence leading from the compounds of general Formula III to the compounds of general Formula II, whereby the starting compound is one obtained at any particular stage as an intermediate product and the missing operations are carried out, or the process is interrupted at some stage, or whereby a starting material is formed under the reaction conditions, or whereby the reaction components are optionally present in the form of their salts.

Belonging to the object of the invention are also the new starting materials for the present process corresponding to general Formula II, as well as the preliminary products of general Formula III and the other intermediate products of general Formulas IV, V, VII and VIII.

Optionally, the new compounds of the general Formula I obtained according to the invention and containing as $R_2$ two hydrogen atoms, thus constituting cyclic amines, are converted in the usual manner into their acid addition salts with inorganic and organic acids. For example, to a solution of a corresponding compound of the general Formula I in an organic solvent such as benzene, diethyl ether, methanol, ethanol or acetone, is added the acid desired as the salt component, or a solution of the acid, and the salt, which has precipitated immediately or after the addition of a second organic liquid such as, e.g. diethyl ether to methanol, is separated. Liberation of the bases from their acid addition salts is likewise performed in the usual manner by reaction with basic substances such as, e.g. sodium carbonate or sodium bicarbonate.

For use as active substances for pharmaceutical preparations it is possible to employ, instead of free basic compounds of the general Formula I, pharmaceutically acceptable acid addition salts thereof, i.e. salts with such acids, the anions of which exhibit, in the case of the dosages in question, either no inherent pharmacological action or a desired one. Furthermore, it is of advantage if the salts to be used as active substances crystallize well and are not, or only slightly, hygroscopic. For salt formation with compounds of the general Formula I suitable for the purpose, it is possible to use, e.g. hydrochloric acid, hydrobromic acid, sulphuric acid, phosphoric acid, methanesulphonic acid, ethanesulphonic acid, β-hydroxyethanesulphonic acid, acetic acid, malic acid, tartaric acid, citric acid, lactic acid, succinic acid, fumaric acid, maleic acid, benzoic acid, salicylic acid, phenylacetic acid, mandelic acid, embonic acid or 1,5-naphthalenedisulphonic acid.

The present invention also relates to the production of pharmaceutical preparations for application in human or veterinary medicine and which contain the new pharmacologically effective compounds of the general Formula I of the present application as active substances, together with a pharmaceutical carrier. Used as carriers are organic or inorganic substances which are suitable for enteral administration, e.g. oral, parenteral, or topical administration. Suitable for the formation thereof are such substances which do not react with the new compounds, such as e.g. water, gelatine, lactose, starch, magnesium stearate, talcum, vegetable oils, benzyl alcohols, rubber, polyalkylene glycols, vaselines, cholesterol and other known medicament-carriers. The pharmaceutical preparations can be in solid form, e.g. as tablets, dragees or capsules; or in liquid or semi-liquid form as solutions, suspensions, emulsions, ointments or creams. Optionally, these pharmaceutical preparations are sterilized and/or they contain auxiliaries such as preservatives, stabilizers, wetting or emulsifying agents, salts for modifying the osmotic pressure, or buffers. They can also contain other therapeutically valuable substances. The new substances can also serve as starting products for the production of other valuable compounds.

The compounds of the general Formula I can also be used as animal-feed additives.

The invention is described in more detail in the following examples; these in no way limit, however, the scope of the invention. The temperatures are given in degrees Centigrade. The rotations are measured in chloroform; concentrations are given in parenthesis. The IR spectra are measured in chloroform, or in another solvent given in parenthesis; the absorption bands are given in $cm^{-1}$. The UV spectra are taken in ethanol; absorption maxima are stated in nm, ε-values are in parenthesis.

Celite is a tradename of the Johns-Manville International Corp., New York.

DETAILED DESCRIPTIONS

EXAMPLE 1

150 mg of 3β,20 ξ-diacetoxy-14β-hydroxy-18-(N-methyl-2-chloroacetamido)-5α,17α-pregnane (see Example 7) are dissolved in 18 ml of absolute tetrahydrofuran and 18 ml of absolute benzene; to the obtained solution are added, one after the other, 80 mg of sodium hydride and 0.3 ml of a solution of 160 mg of ethanol in 100 ml of absolute tetrahydrofuran. The mixture is stirred for 3 hours at 50°; to the reaction mixture is then added ethyl acetate, and the whole washed until neutral with saturated aqueous sodium chloride solution. The crude product remaining behind after concentration by evaporation is chromatographed in ethyl acetate on silica gel. By this means are obtained 105 mg of 1'-methyl-2'-oxo-3β,20ξ-diacetoxy-14β,18-(epoxyethanoimino)-5α,17α-pregnane. After two crystallizations from acetone/hexane, the melting point is 251°–252°. IR: 1730, 1650, 1250. $[\alpha]_D = -100°$ (0.46).

EXAMPLE 2

105 mg of 1'-methyl-2'-oxo-3β,20ξ-diacetoxy-14β,18-(epoxyethanoimino)-5α,17α-pregnane are boiled in 40 ml of absolute diethyl ether for 5 hours with 250 mg of lithium aluminium hydride. The reaction mixture is then carefully decomposed with a little water, filtered off from the precipitated aluminium hydroxide, afterwards rinsed with methylene chloride, and the filtrate concentrated by evaporation. Thus obtained are 105 mg of crude 1'-methyl-3β,20ξ-dihydroxy-14β,18(epoxyethanoimino)-5α,17α-pregnane (IR: 3600). These are acetylated for ca. 15 hours at room temperature in 20 ml of acetic anhydride/pyridine mixture (1:1). By concentration of the reaction mixture in vacuo, and chromatography in ethyl acetate/methanol (9:1) of the crude product remaining behind are obtained 50 mg of 1'-methyl-3β,20ξ-diacetoxy-14β,18-(epoxyethanoimino)-5α,17α-pregnane. M.P. after two crystallizations from methanol/water = 198°–200° (decomposition). IR: 1730, 1250. $[\alpha]_D = -51°$ (0.37).

EXAMPLE 3

33 mg of 3β-methoxy-3α,9α-epoxy-11α,20ξ-diacetoxy-14β-hydroxy-18-(N-methyl-2-chloracetamido)-5β,17α-pregnane (see Example 8) are dissolved in 3 ml of absolute tetrahydrofuran and 3 ml of absolute benzene; first 20 mg of sodium hydride and then 0.1 ml of a solution of 160 mg of ethanol in 100 ml of absolute tetrahydrofuran are added. The mixture is boileld for 4 hours under an argon atmosphere. The excess sodium hydride is then carefully decomposed by the addition of moist ether. Then the reaction mixture is diluted with ethyl acetate and washed neutral with saturated aqueous sodium chloride solution. After concentration by evaporation, the residual crude product is chromatographed in ethyl acetate on silica gel. 26 mg of 1'-methyl-2'-oxo-3β-methoxy-3α,9α-epoxy-11α,20ξ-diacetoxy-14β,18-(epoxyethanoimino)-5β,17α-pregnane is obtained which, after recrystallizing once from acetone/hexane, melts at 239°–240°. $[\alpha]_D = -64°$ (0.25). IR: 1725, 1650, 1250.

EXAMPLE 4

19 mg of 1'-methyl-2'-oxo-3β-methoxy-3α,9α-epoxy-11α,20ξ-diacetoxy-14β, 18-(epoxyethanoimino)-5β,19α-pregnane are boiled in a mixture of 7 ml of absolute ether and 2 ml of absolute tetrahydrofuran with 50 mg of lithium aluminium hydride for 5½ hours. Then the excess lithium aluminium hydride is decomposed with saturated aqueous ammonium sulphate solution, diluted with ethyl acetate and washed neutral with aqueous sodium chloride solution. After concentration by evaporation, the crude product which remains is chromatographed on silica gel in an ethyl acetate/methanol solution (10:1), the ethyl acetate portion of which having been previously saturated with 10% aqueous ammonia. 13 mg of crystalline 1'-methyl-3β-methoxy-3α,9α-epoxy-11α,20ξ-dihydroxy-14β,18-(epoxyethanoimino)-5β,17α-pregnane are obtained, which, after a crystallization from acetone/hexane, melts at 160–180° with decomposition. IR: 3640, 3560, 3500-3300 broad, 1095, 1000, 950 in $CH_2Cl_2$.

EXAMPLE 5

10 mg of 1'-methyl-3β-methoxy-3α,9α-epoxy-11α,20ξ-dihydroxy-14β,18-(epoxyethanoimino)-5β,17α-pregnane are acetylated in 5 ml of acetanhydride/pyridine mixture (1:1) for 3 hours at 70°. The reaction mixture is then concentrated by evaporation in vacuum and the crude product is chromatographed in ethyl acetate, which has been saturated with ammonia, on silica gel. 9 mg of 1'-methyl-3β-methoxy-3α,9α-epoxy-11α,20ξ-diacetoxy-14β,18-(epoxyethanoimino)-5β,17α-pregnane are thus obtained, which thus far it has not been possible to crystallize. IR: 1725, 1250, 1100, 1005, 960.

EXAMPLE 6

30 mg of 1'-methyl-3β-methoxy-3α,9α-epoxy-11α,20ξ-dihydroxy-14β,18-(epoxyethanoimino)-5β,17α-pregnane are allowed to stand for 24 hours at room temperature in a mixture of 1 ml of 70% aqueous perchloric acid and glacial acetic acid to make 10 ml. Then the reaction mixture is alkalized with 2 N sodium hydroxide solution, ethyl acetate is added, the solution obtained is washed neutral with saturated sodium chloride solution and concentrated by evaporation. About 23 mg of crude 1'-methyl-3α,9α-epoxy-3β,11α,20ξ-trihydroxy-14β,18-(epoxyethanoimino)-5β,17α-pregnane remain which are chromatographed in a mixture of ethyl acetate, which has been saturated with 10% aqueous ammonia solution and then dried with magnesium sulphate, and methanol (10:1) on very pure silica gel. About 15 mg of pure substance are obtained. IR: 3620, 3560, 3500–3300 broad.

EXAMPLE 7

The 3β,20ξ-diacetoxy-14β-hydroxy-18-(N-methyl-2-chloroacetamido)-5α,17β-pregnane used in Example 1 as starting material can be produced in the following manner:

a. 100 g of lead tetracetate are dried for 2 hours in darkness at room temperature. To this are then added 20 g of dry calcium carbonate, and the mixture is refluxed for one hour, with stirring, in 1700 ml of abs. cyclohexane. To this boiling suspension is thereupon added, with vigorous stirring, a hot solution of 21.8 g of 3β-acetoxy-20β-hydroxy-5α-pregnane in 500 ml of abs. cyclohexane and 7.7 g of solid iodine; the reaction mixture is then boiled for a further 30 minutes with vigorous stirring, while externally irradiating with a 1,000 Watt incandescent lamp. A practically complete decolouration of the iodine-containing reaction mixture is thereby observed. After cooling, the mixture is filtered through cotton wool, and the filtrate concentrated in vacuum. The concentration-residue is oxidized for 30 minutes in 800 ml of acetone, at a temperature of ca. 5°, with an excess of an 8 N solution of chromium trioxide in 8 N sulphuric acid. 20 ml of isopropanol is then added, the whole diluted with ethyl acetate, and washed until neutral with saturated aqueous sodium chloride solution. The crude product obtained after drying and concentration by evaporation of the organic phase is refluxed for 3 hours with stirring, in 1,500 ml of abs, methanol with 25 g of silver acetate. The mixture is afterwards filtered through cotton wool, concentrated in vacuum, dissolved in ether, and filtered on neutral aluminum oxide (Act. III). The thereby obtained crude product is chromatographed on 2 kg of silica gel, Merck (grain size 0.05–0.2 mm), which has been previously deactived with 200 ml of water. With a benzene/ethyl acetate mixture (10:1) are thereby eluted 7.5 g of 3β-acetoxy-18,20-epoxy-20ξ-hydroxy-5α-pregnane, M.P. 169° (twice recrystallized from acetone/hexane). $[\alpha]_D = +33°$ (0.45). IR: 3590, 1725, 1250.

b. 1 g of 3β-acetoxy-18,20-epoxy-20ξ-hydroxy-5α-pregnane is dissolved in a mixture of 7 ml of pyridine and 7 ml of acetanhydride, and the solution obtained is heated in a nitrogen atmosphere for 10 hours to 95°. The solution is allowed to cool; it is then diluted with ethyl acetate, and washed successively with 2 N aqueous hydrochloric acid, saturated aqueous sodium chloride solution, saturated aqueous sodium bicarbonate solution, and again with saturated aqueous sodium chloride solution until the neutral point is attained. The solution is then dried with magnesium sulphate, concentrated in vacuum, and chromatographed on the 100-fold amount of silica gel which has been deactivated previously again with 10 percent water. With benzene/ethyl acetate mixture (10:1) are thereby firstly eluted 395 mg of 3β,18-diacetoxy-20-oxo-5α-pregnane; M.P. 107° after two crystallizations from acetone/hexane, $[\alpha]_D = +70°$ (0.46). IR: 1740, 1710, 1240 (in $CCl_4$). Subsequent fractions consisted of 386 mg of unmodified 3β-acetoxy-18,20-epoxy-20ξ-hydroxy-5α-pregnane.

c. An amount of 1.04 g of 3β,18-diacetoxy-20-oxo-5α-pregnane is brominated in 50 ml of dichloromethane with 1.13 g of 90% pyridinehydrobromideperbromide for 30 minutes at room temperature whilst stirring is maintained. The reaction mixture is then diluted with ethyl acetate, repeatedly washed with saturated aqueous sodium chloride solution, dried over magnesium sulphate, and evaporated in vacuum. Thereby obtained are 1.23 g of crude 3β,18-diacetoxy-17ξ-bromo-20-oxo-5α-pregnane which is advantageously dehydrobrominated, without any purification, by 3 hours boiling in 20 ml of abs. dimethyl formamide under nitrogen. After cooling, the product is diluted with ethyl acetate and washed at least 5 times with water. The organic phase is then dried with magnesium sulphate, and evaporated in vacuum. The obtained crude product is first filtered in dichloromethane solution on neutral aluminium oxide (Act. III), and afterwards chromatographed in benzene/ethyl acetate solution (6:1) on silica gel. By this meaans are obtained 860 mg of 3β,18-diacetoxy-20-oxo-$\Delta^{16}$-5α-pregnene which, after two crystallizations from acetone/hexane, melts at 135°. $[\alpha]_D = +44°$(0.35). IR: 1725, 1670, 1590, 1250. UV: 238 (ε = 8920).

d. An amount of 800 mg of 3β,18-diacetoxy-20-oxo-$66^{16}$-5α-prenene is refluxed for 1 hour, with stirring, with 650 mg of N-bromosuccinimide in 50 ml of carbon tetrachloride in the presence of 50 mg of azo-bis-isobutyronitrile. The mixture is allowed to cool; it is then filtered off from the succinimide which has crystallized out, subsequently washed with carbon tetrachloride, and evaporated in vacuum. The crude bromination product is afterwards boiled for 3 hours with 1 g of sodium iodide in 100 ml of acetone, the whole concentrated in vacuo to ca. 25 ml, diluted with ethyl acetate, and successively washed with aqueous solutions of sodium thiosulphate and sodium chloride. The organic phase dried over magnesium sulphate is concentrated in vacuum, and the crude product chromatographed in benzene/ethyl acetate solution (6:1) on silica gel. Thus obtained are 512 mg of oily 3β,18-diacetoxy-20-oxo-$\Delta^{14,16}$-5α-pregnadiene. IR: 1735, 1650, 1530, 1240 ($CCl_4$). UV: 312 (ε = 6250).

e. To 976 mg of 3β18-diacetoxy-20-oxo-$\Delta^{14,16}$-5α-pregnadiene in 40 ml of chloroform there are added 488 mg of p-nitroperbenzoic acid, and the mixture is stirred in darkness for 19 hours at room temperature. The mixture is then diluted with ethyl acetate, and successively washed with aqueous solutions of potassium iodide, sodium thiosulphate, sodium chloride, sodium bicarbonate, and again sodium chloride, until the neutral point is attained. The ethyl acetate phase dried with magnesium sulphate is concentrated in vacuum in a rotary evaporator, and the crude product chromatographed in benzene/ethyl acetate solution (4:1) on silica gel. In this manner are obtained 550 mg of 3β,18-diacetoxy-14β15β-epoxy-20-oxo-Δ -5α-pregnene, M.P. 128°–129°(twice crystallized from acetone/hexane). $[\alpha]_D = +62°$ (0.42). IR: 1725, 1670, 1600, 1250. UV: 249 (ε = 8270).

f. An amount of 300 mg of 3β,18-diacetoxy-14β,15β-epoxy-20-oxo-$\Delta^{16}$-5α-pregnene is exhaustively hydrogenated in 80 ml of ethanol in the presence of 100 mg of 5% palladium on barium sulphate at room temperature and under normal pressure. After completion of the hydrogen absorption, the catalyst is separated by filtration, and the filtrate is evaporated in vacuum. The crude hydrogenation product is then filtered on neutral aluminum oxide (Act. III). Thus obtained are 282 mg of oily 3β,18-diacetoxy-14β-hydroxy-20-oxo-5α,17α-pregnane. IR: 3600-3200 broad, 1735, 1240 ($CCl_4$).

g. An amount of 282 mg of 3β,18-diacetoxy-14β-hydroxy-20-oxo-5α,17α-pregnane is stirred in 40 ml of tetrahydrofuran with 430 mg of lithium aluminium tritert. butoxy-hydride for 5 hours at room temperature. The excess hydride is then decomposed with 5% aqueous acetic acid (ca. 2 ml), diluted with ethyl acetate and washed successively with aqueous solutions of sodium bicarbonate and sodium chloride until the neutral point is attained. The crude product obtained after drying and concentration in vacuum is chromatographed in benzene/ethyl acetate solution (1:1) on silica gel, whereby 217 mg of oily 3β,18-diacetoxy-14α,20ξ-dihydroxy-5α,17α-pregnane are eluted. IR: 3600-3300 broad, 1735, 1240 ($CCl_4$).

h. 150 mg of 3β,18-diacetoxy-14β,20ξ-dihydroxy-5α17α-pregnane are allowed to stand in 10 ml of pyridine/acetanhydride mixture (1:1) for 16 hours at room temperature. The acetylation mixture is then concentrated in vacuum, whereby 115 mg of chromatographically homogeneous oily 3β,18,20ξ-triacetoxy-14β-hydroxy-5α,17α-pregnane are obtained. IR: 3580, 1735, 1240 (($CCl_4$).

i. An amount of 150 mg of 3β,18,20ξ-triacetoxy-14β-hydroxy-5α,17α-pregnane is hydrolyzed in a mixture of 32 ml of methanol and 3.5 ml of aqueous 1% sodium bicarbonate solution for 5 minutes at boiling temperature. The solution is then neutralized with glacial acetic acid, diluted with ethyl acetate, and washed until neutral with aqueous sodium chloride solution. The crude product remaining behind after concentration by evaporation is chromatographed in benzene/ethyl acetate solution (1:1) on silica gel. Firstly eluted thereby are 38 mg of unmodified starting material, there then follow 67 mg of transition fractions, and aftewards 49 mg of 3β,20ξ-diacetoxy-14β,18-dihydroxy-5α,17α-pregnane, M.P. 180°–181° (twice crystallized from acetone/hexane). $[\alpha]_D = -7°$ (0.46). IR: 3600-3300, 1730, 1240 ($CCl_4$).

j. 95 mg of 3β,20ξ-diacetoxy-14β,18-dihydroxy-5α,17α-pregnane are oxidized in 10 ml of acetone at 0° for 2 minutes, with stirring, with an excess of an 8 N solution of chromium trioxide in 8 N sulphuric acid. The chromium trioxide excess is then decomposed by the addition of 2 ml of isopropanol. The reaction mixture is taken up in ethyl acetate, and washed with saturated aqueous sodium chloride solution until a neutral, colourless organic phase results. After drying and concentration thereof in vacuum, 85 mg of crude product are obtained, which are chromatographed in benzene/ethyl acetate solution (1:1) on silica gel. Eluted thereby are 65 mg of 3β,20ξ-diacetoxy-14β-hydroxy-18-oxo-5α,17α-pregnane which, after two crystallizations from acetone/hexane, melts at 170°–171°. $[\alpha]_D = 0°$ (0.42). IR: 3610, 3480, 2720, 1735, 1720 + 1710 (double bands for the aldehydecarbonyl), 1240 ($CCl_4$).

k. An amount of 270 mg of 3α,20ξ-diacetoxy-14β-hydroxy-18-oxo-5α,17α-pregnane is heated with 50 ml of methylamine in 50 ml of abs. benzene for 15 hours in a bomb tube to 120°. The mixture is concentrated in vacuo, dissolved in 10 ml of acetanhydride/pyridine mixture (1:1), allowed to stand for 3 hours at room temperature, and concentrated in vacuum, whereby 260 mg of 3β,20ξ-diacetoxy-14β-hydroxy-18-(methylimino)-5α,17α-pregnane are obtained. IR: 3300 broad, 2760, 1730, 1655, 1240 $CCl_4$).

l. The methylimino compound obtained according to (k) is reduced in 50 ml of methanol with 300 mg of sodium borohydride in 10 of water at 20° for 20 minutes. To the reaction mixture is then added ethyl acetate, the whole washed until neutral with saturated aqueous sodoium chloride solution, and concentrated by evaporation, whereby 280 mg of 3β,20ξ-diacetoxy-14β-hydroxy-18-(methylamino)-5α,17α-preganane are obtained. IR: 3500-2600 broad, 1730, 1250.

m. The methylamino compound obtained according to (1) is dissolved together with 135 mg of chloroacetyl chloride in 50 ml of chloroform. To the solution are added at 0°, with vigorous stirring, 48 mg of sodium hydroxide in 10 ml of water. After 10 minutes the solution is diluted with more chloroform, the organic phase separated, washed with saturated aqueous sodium chloride solution until neutral, dried with magnesium sulphate, concentrated in vacuum, and the residue chromatographed in ethyl acetate on silica gel. In this manner are obtained 186 mg of 3β,20ξ-diacetoxy-14β-hydroxy-18-(N-methyl-2-chloroacetamido)-5α,17α-pregnane, M.P. 194°–196°. IR: 3380 broad, 1730, 1640, 1250.

EXAMPLE 8

The 3β-methoxy-3α,9α-epoxy-11α,20ξ-diacetoxy-14β-hydroxy-18-(N-methyl-2-chloracetamido)-5β,17α-pregnane, used as starting material in Example 3, can be produced as follows:

a. 10 g of (20R)-3-ethylenedioxy-20-hydroxy-$\Delta^{5,9(11)}$-pregnadien-18-acid lactone (→ 20) are boiled in 300 ml of absolute tetrahydrofuran with 7 g of lithium aluminium hydride for 2 hours. Then the excess hydride is decomposed with about 5 ml of saturated aqueous ammonium sulphate solution while cooling with ice. Then 20 g of Celite are added and stirred for 30 minutes at room temperature; the aluminium hydroxide/Celite mixture is removed by filtration, rinsed with ethyl acetate, and the filtrate is concentrated by evaporation in vacuum to yield 9.7 g of (20R)-3-ethylenedioxy-18,20-dihydroxy-$\Delta^{5,9(11)}$-pregnadiene which, after a crystallization from methylene chloride/-hexane, melts at 201°. $[\alpha]_D = -35°$ (0.49). IR: 3600, 3500-3200.

b. 10.7 g of (20R)-3-ethylenedioxy-18,20-dihydroxy-$\Delta^{5,9(11)}$-pregnadiene are refluxed for two hours in 1,500 ml of acetone and 100 ml of water with 1.5 g of p-toluenesulphonic acid. The reaction solution is then concentrated under vacuum to about 500 ml. By careful addition of water to this solution, the desired (20R)-3-oxo-18,20-dihydroxy-$\Delta^{4,9(11)}$-pregnadiene precipitates as crystals. These are then suction filtered, washed neutral with a large amount of water, dried, and recrystallized once from methanol/water to yield 7 g of crystals having a melting point of 194°. $[\alpha]_D = +59°$ (0.61).IR: 3600, 3550-3100, 1660, 1615. UV: 244 (16700).

c. 7 g of (20R)-3-oxo-18,20-dihydroxy-$\Delta^{4,9(11)}$-pregnadiene are hydrogenated in 250 ml of 0.1 N ethanolic potassium hydroxide solution in the presence of 1 g of 5% palladium/charcoal catalyst with one equivalent of hydrogen. After the calculated amount of hydrogen has been taken up, the hydrogenation is interrupted, and the catalyst is removed from the solvent by filtration. By the careful addition of water to the filtrate, (20R)-3-oxo-18,20-dihydroxy-$\Delta^{9(11)}$-5β-pregnene precipitates as crystals. After suction filtration, washing neutral with a large amount of water, drying in vacuum and recrystallization from methanol/water, 6.7 g of pure crystallization product having a melting point of 198° are obtained. $[\alpha]_D = -2°$ (0.49). IR: 3600, 3500-3200, 1705.

d. 5.1 g of (20R)-3-oxo-18,20-dihydroxy-$\Delta^{9(11)}$-5β-pregnene in 60 ml of pyridine and 40 ml of acetanhydride are allowed to stand for 1 hour at room temperature. Then the excess acetanhydride is decomposed by the careful addition of 80 ml of methanol, the temperature being kept at about 0° by the addition of solid carbon dioxide in portions. Then the reaction mixture is left to stand for 30 minutes at room temperature, evaporated in vacuum, and the crude portion is chromatographed in benzene/ethyl acetate (1:1) on silica gel. First 1.5 g of (20R)-3-oxo-18,20-diacetoxy-$\Delta^{9(11)}$-5β-pregnene [IR: 1740-1700, 1250], which can be reconverted into the starting material for the acetylation by alkaline hydrolysis in 5% methanolic potassium hydroxide solution. Later fractions yield 2.1 g of (20R)-3-oxo-18-acetoxy-20-hydroxy-$\Delta^{9(11)}$-5β-pregnene which, after crystallization from methylene chloride/-hexane, melts at 110°. $[\alpha]_D = 0°$ (0.48). IR: 3580, 1730, 1710, 1250. Further fractions yield 2.0 g of unmodified (20R)-3-oxo-18,20-dihydroxy-$\Delta^{9(11)}$5β-pregnene.

e. 1.5 g of (20R)-3-oxo-18-acetoxy-20 -hydroxy-$\Delta^{9(11)}$-5β-pregnene in 100 ml of acetone are oxidized at room temperature while stirring with an excess of an 8 N solution of chromium trioxide in 8 N sulphuric acid for 15 minutes. Then 5 ml of methanol are added, the mixture is diluted with ethyl acetate, and the organic phase is washed with saturated aqueous sodium chloride solution. After drying and concentration by evaporation, 1.49 g of crude product are obtained which, dissolved in dichloromethane, is filtered through neutral aluminium oxide (Act. III). It is then crystallized from acetone/hexane to yield 1.4 g of 3,20-dioxo-18-acetoxy-$\Delta^{9(11)}$-5β-pregnene, M.P. 112°–114°. $[\alpha]_D = +67°$ (0.48). IR: 1745, 1720, 1710, 1230 ($CCl_4$).

f. 1.2 g of osmium tetroxide are added to 1.15 g of 3,-20-dioxo-18-acetoxy-$\Delta^{9(11)}$-5β-pregnene in 15 ml of pyridine and allowed to stand for 6½ days in the dark at room temperature. Then the reaction mixture is evaporated to dryness in vacuum with the repeated addition of benzene; the residue is dissolved in 40 ml of freshly distilled dioxane. Then 40 ml of saturated, aqueous ammonium chloride solution are added and hydrogen sulphide is passed through the two-phase system during one hour. 6 g of shredded filter paper are added. After heating for 1 hour at 70°, the mixture is filtered through Celite and then successively washed with 500 ml of ethyl acetate, 100 ml of methanol, 100 ml of water, 100 ml of dichloromethane and again 500 ml of ethyl acetate. The filtrate is diluted with more ethyl acetate and washed several times with saturated, aqueous ammonium chloride solution. Then the organic phase is dried with magnesium sulphate and concentrated by evaporation in vacuum. 1.23 g of crude product are obtained which, in ethyl acetate/methanol solution (9:1), is chromatographed on silica gel to yield 1.13 g of 3β,11α-dihydroxy-3α,9α-epoxy-18-acetoxy-20 -oxo-5β-pregnane [IR: 3600-3200, 1740, 1710, 1230 ($CCl_4$)], which is further processed without purification.

g. 775 mg of 3β,11α-dihydroxy-3α,9α-epoxy-18-acetoxy-20-oxo-5β-pregnane in 30 ml of 0.1 N absolute methanolic hydrogen chloride solution are left for 20 minutes at room temperature. Then the mixture is poured onto a saturated, aqueous sodium bicarbonate solution, extracted with ethyl acetate, and the resulting organic phase is washed several times with saturated, aqueous sodium chloride solution. After drying the solution with magnesium sulphate and concentration by evaporation, the crude product obtained (745 mg) is acetylated in 30 ml of acetanhydride/pyridine mixture (1:1) for 3½ hours at 70°. The reaction mixture is then concentrated by evaporation in vacuum, and the crude product obtained is filtered in dichloromethane on neutral aluminium oxide (Act. III) to yield 805 mg of 3β-methoxy-3α,9α-epoxy-11α,18-diacetoxy-20-oxo-5β-pregnane which, after one crystallization from acetone/hexane, melts at 151°–152°. $[\alpha]_D = +106°$ (0.46). IR: 1735, 1705, 1245.

h. 500 mg of 3β-methoxy-3α,9α-epoxy-11α,18-diacetoxy 20-oxo-5β-pregnane in 40 ml of carbon tetrachloride are boiled for 1 hour with 208 mg of finely pulverized 96% N-bromosuccinimide and 10 mg of aza-bis-isobutyronitrile while irradiating externally with a 1,000 W incandescent lamp. After cooling, the precipitated succinimide is removed by filtration, rinsed with carbon tetrachloride, and the filtrate is concentrated by evaporation in vacuum. The resultant bromination product, without purification, is heated at 120° for 160 minutes under a nitrogen atmosphere in 40 ml of absolute dimethyl formamide with 500 mg of lithium carbonate and 500 mg of lithium bromide. The mixture is then diluted with a large amount of ethyl acetate, and the organic phase is washed at least 5 times with water. After drying and evaporating the ethyl acetate phase, 488 mg of crystals are obtained which, in dichloromethane, are filtered on neutral aluminium oxide (Act. III) to yield 435 mg of 3β-methoxy-3α,9α-epoxy-11α,18-diacetoxy-20-oxo-$\Delta^{16}$-5β-pregnene which, after crystallizing twice (307 mg), melts at 167°–168°. $[\alpha]_D = +61°$ (0.53). IR: 1730, 1668, 1590, 1245. UV: 237 (8750). After chromatography of the mother liquor in hexane/acetone solution (3:1) on silica gel and subsequent crystallization from acetone/hexane, 37 mg more of the product can be obtained.

i. 500 mg of 3β-methoxy-3α,9α-epoxy-11α,18-diacetoxy-20-oxo-$\Delta^{16}$-5β-pregnene in 150 ml of carbon tetrachloride are boiled for 17 minutes with 240 mg of 96% N-bromosuccinimide and 20 mg of aza-bis-isobutyronitrile while irradiating externally with a 1,000 W incandescent lamp. After cooling, the precipitated succinimide is removed by filtration. After concentration of the filtrate by evaporation, the residue obtained is dissolved in 50 ml of absolute dimethyl formamide and heated under nitrogen for 10 minutes at 130° while stirring with 500 mg of lithium bromide and 500 mg of lithium carbonate. The mixture is then substantially concentrated in vacuum, diluted with ethyl acetate, and washed several times with water. After drying and concentration by evaporation of the organic phase, the crude product obtained is chromatographed in benzene/ethyl acetate solution (2:1) on silica gel to yield 330 mg of 3β-methoxy-3α, 9α-epoxy-11α,18-diacetoxy-20-oxo-$\Delta^{14,16}$-5β-pregnadiene which, after crystallizing once from acetone/hexane, melts at 146°–147°. $[\alpha]_D = +302°$ (0.50). IR: 1730, 1645, 1525, 1465, 1245, 845. UV: 312 (10550).

j. 250 mg of 3β-methoxy-3α,9α-epoxy-11α,18-diacetoxy-20-oxo-$\Delta^{14,16}$-5β-pregnadiene which has been purified by chromatography but not recrystallized, are boiled for 80 minutes with 500 mg of p-nitroperbenzoic acid in a mixture of 100 ml of chloroform and 1 ml of absolute methanol. The mixture is then diluted with ethyl acetate, and successively washed with ice-cold, aqueous solutions of sodium iodide, sodium thiosulphate, sodium chloride, sodium bicarbonate and again sodium chloride. After concentration of the organic phase by evaporation, the crude product obtained is chromatographed in hexane/acetone solution (2:1) on silica gel to yield 210 mg of 3β-methoxy-3α,9α:14β,15β-diepoxy-11α,18-diacetoxy-20-oxo-$\Delta^{16}$-5β-pregnene which, after crystallizing 3 times from acetone/hexane, melts at 198°. $[\alpha]_D = +66°$ (0.58). IR: 1735, 1670, 1605, 1240. UV: 248 (6890).

k. 100 mg of 3β-methoxy-3α,9α:14β,15β-diepoxy-11α,18-diacetoxy-20-oxo-$\Delta^{16}$-5β-pregnene in 20 ml of ethanol are thoroughly hydrogenated in the presence of 40 mg of 5% palladium on barium sulphate. Then the catalyst is removed by filtration. Chromatography in benzene/ethyl acetate solution (1:1) on silica gel yields 55 mg of 3β-methoxy-3α,9α-epoxy-11α,18-diacetoxy-14β-hydroxy-20-oxo-5β,17α-pregnane which, after crystallizing once from acetone/hexane, melts at 154°. $[\alpha]_D = 0°$ (0.40). IR: 3600, 3400 broad, 1735, 1705, 1245.

l. 200 mg of sodium boro-hydride in 1 ml of water are added at room temperature to 197 mg of 3β-methoxy-3α,9α-epoxy-11α,18-diacetoxy-14β-hydroxy-20-oxo-5β,17α-pregnane in 10 ml of methanol. The mixture is then stirred for 20 minutes at room temperature, diluted with a large amount of ethyl acetate, and the resulting organic phase is washed neutral with saturated, aqueous sodium chloride solution. It is then dried with magnesium sulphate and evaporated in vacuum. The resultant crude product is acetylated in 20 ml of pyridine/acetanhydride mixture (1:1) for 3 hours at room temperature, then evaporated in vacuum and chromatographed in benzene/ethyl acetate solution (1:1) on silica gel, whereby 172 mg of 3β-methoxy-3α,9α-epoxy-11α,18,20ξ-triacetoxy-14β-hydroxy-5β,17α-pregnane are eluted. After crystallizing twice from acetone/hexane, it melts at 195°. $[\alpha]_D = +7°$ (0.31). IR: 3570, 1725, 1250.

m. 132 mg of 3β-methoxy-3α,9α-epoxy-11α,18,20ξ-triacetoxy-14β-hydroxy-5β,17α-pregnane are boiled for 7 minutes in 18 ml of a 0.1% sodium bicarbonate solution in 90% aqueous methanol. The reaction solution is then poured onto ice, immediately extracted with ethyl acetate, and the organic phase is washed neutral with saturated, aqueous sodium chloride solution. After drying and concentrating by evaporation of the ethyl acetate phase, the crude product obtained is chromatographed in benzene/ethyl acetate solution (1:1) on silica gel to yield, besides 18 mg of starting material, 83 mg of 3β-methoxy-3α,9α-epoxy-11α,20ξ-diacetoxy-14β,18-dihydroxy-5β,17α-pregnane which, after crystallizing once from acetone/hexane, melts at 203°–205°. $[\alpha]_D = -2°$ (0.47). IR: 3600, 3460 broad, 1725, 1250.

n. 90 mg of 3β-methoxy-3α,9α-epoxy-11α,20ξ-diacetoxy-14β,18-dihydroxy-5β,17α-pregnane in 10 ml of acetone are oxidized at 0° with stirring for 3 minutes with a slight excess of an 8 N solution of chromium trioxide in 8 N aqueous sulphuric acid (0.35 ml). Then the excess chromium trioxide is decomposed by the addition of isopropanol, the mixture is diluted with ethyl acetate, and washed neutral as quickly as possible with saturated, aqueous sodium chloride solution. After drying and concentration by evaporation of the ethyl acetate phase, the resulting crude product is chromatographed in benzene/ethyl acetate solution (1:1) on silica gel to yield 62 mg of 3β-methoxy-3α,9α-epoxy-11α,20ξ-diacetoxy-14β-hydroxy-18-oxo-5β,17α-pregnane which, after crystallizing once from acetone/hexane, melts at 209°. $[\alpha]_D = +13°$ (0.40). IR: 3580, 3450, 2730, 1730, 1705, 1250.

o. 64 mg of 3β-methoxy-3α,9α-epoxy-11α,20ξ-diacetoxy-14β-hydroxy-18-oxo-5β,17α-pregnane are heated with 1 ml of methylamine in 10 ml of absolute benzene for 15 hours in a closed tube at 120°. After evaporating in vacuum, the residue is dissolved in 10 ml of acetanhydride/pyridine mixture (1:1), then left for 3 hours at room temperature and concentrated by evaporation in vacuum. 67 mg of 3β-methoxy-3α,9α-epoxy-11α,20ξ-diacetoxy-14β-hydroxy-18-methylimino-5β,17α-pregnane are obtained. IR: 3200 broad, 1725, 1665, 1250.

p. The methylimino compound obtained according to (o) is reduced in 10 ml of methanol with 75 mg of sodium boro-hydride in 1 ml of water for 20 minutes at room temperature. Then ethyl acetate is added to the reaction mixture which is then washed neutral with saturated, aqueous sodium chloride solution, and concentrated by evaporation. 60 mg of 3β-methoxy-3α,9α-epoxy-11α,20ξ-diacetoxy-14β-hydroxy-18-methylamino-5β,17α-pregnane are obtained. IR: 3500-2600, 2790, 1725, 1250.

q. The methylamino compound obtained according to (p) is dissolved together with 77 mg of chloracetyl chloride in 10 ml of chloroform. While stirring vigorously, 28 mg of sodium hydroxide in 2 ml of water are added at 0°. After 10 minutes, the solution is diluted with ethyl acetate, the organic phase is separated, washed neutral with saturated, aqueous sodium chloride solution, dried with magnesium sulphate, evaporated in vacuum, and the residue is chromatographed in ethyl acetate on silica gel to yield 42 mg of 3β-methoxy-3α,9α-epoxy-11α,20ξ-diacetoxy-14β-hydroxy-18-(N-methyl-2-chloracetamide)-5β,17α-pregnane which, after crystallizing once from acetone/hexane, melts at 173°. $[\alpha]_D = +12°$ (0.42). IR: 3350 broad, 1725, 1640, 1250.

What is claimed is:

1. A compound of the Formula I

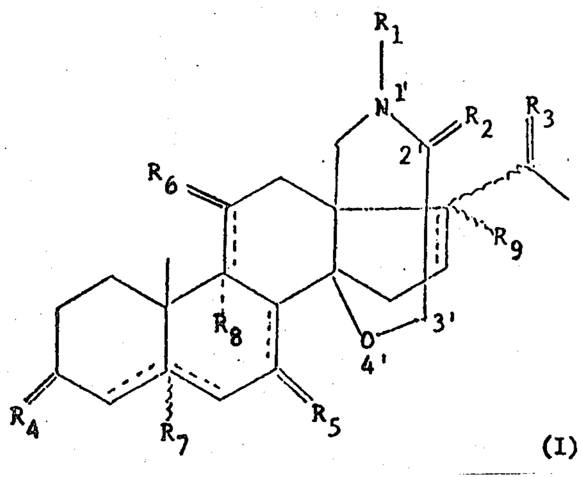

wherein $R_1$ represents a lower alkyl group, the benzyl group or hydrogen, $R_2$ represents an oxo radical or two hydrogen atoms, $R_3$ represents oxo or a ketal derived from a lower alkanediol or lower alkanols, or hydroxyl, hydroxyl esterified with a lower alkanoic acid or hydroxyl etherified with a lower alkanol or benzyl alcohol and a hydrogen atom, $R_4$ represents oxo or a ketal derived from a lower alkanediol or lower alkanols, or hydroxyl, hydroxyl esterified with a lower alkanoic acid or hydroxyl etherified with a lower alkanol or benzyl alcohol and a hydrogen atom, or hydroxyl, hydroxyl etherified with a lower alkanol or benzyl alcohol and together with $R_8$ an epoxy radical, $R_5$ and $R_6$ each independently represent oxo or a ketal derived from a lower alkanediol or lower alkanols, or hydroxyl, hydroxyl esterified with a lower alkanoic acid or hydroxyl etherified with a lower alkanol or benzyl alcohol and a hydrogen atom, or two hydrogen atoms, or, when occurring at a double bond, one hydrogen atom, $R_7$ represents an α- or β-oriented hydrogen atom, $R_8$ represents an α-oriented hydrogen atom, an α-oriented hydroxyl group, or together with $R_4$ an epoxy radical, and $R_9$ represents an α- or β-oriented hydrogen atom, or hydroxyl, hydroxyl esterified with a lower alkanoic acid or hydroxyl etherified with a lower alkanol or benzyl alcohol, whereby double bonds may be present in the positions 5 or 4, when $R_4$ represents a free oxo radical, as well as 7, 9 (11) and 16 corresponding to the dotted lines with the elimination of $R_7$, $R_8$ and/or $R_9$, as well as pharmaceutically acceptable acid addition salts of a compound of Formula I in which $R_2$ designates two hydrogen atoms with the exception of Batrachotoxinin A.

2. A compound according to claim 1, having Formula Ia

Ia)

wherein:

$R_4'$ represents a lower alkyl group or the benzyl group, whereby double bonds may be present in the positions 5, 7 and 16 corresponding to the dotted lines, with the elimination of $R_7$ and $R_9$ accordingly, as well as pharmaceutically acceptable acid addition salts of a compound of Formula Ia in which $R_2$ represents two hydrogen atoms.

3. A compound according to claim 2, wherein $R_2$ represents the oxo radical, $R_3$ represents a hydroxyl group or lower alkanoyloxy group together with a hydrogen atom, $R_4'$ represents a lower alkyl group or the benzyl group, $R_5$ and $R_6$ each represent two hydrogen atoms, or a hydroxyl group or lower alkanoyloxy group together with a hydrogen atom.

4. A compound according to claim 2, wherein $R_2$ represents two hydrogen atoms, $R_3$ represents a hydroxyl group or lower alkanoyloxy group together with a hydrogen atom, $R_4'$ represents a lower alkyl group or the benzyl group, $R_5$ and $R_6$ each represent two hydrogen atoms, or a hydroxyl group or lower alkanoyloxy group together with a hydrogen atom.

5. A compound according to claim 2 which is 1'-methyl-2'-oxo-3β,20ξ-diacetoxy-14β,18-(epoxyethanoimino)-5α,17α-pregnane.

6. A compound according to claim 2 which is 1'-methyl-2'-oxo-3β-methoxy-3α,9α-epoxy-11α,20ξ-diacetoxy-14β,18-(epoxyethanoimino)-5β,17α-pregnane.

7. A compound according to claim 2 which is 1'-methyl-3β,20ξ-dihydroxy-14β,18-(epoxyethanoimino)-5α,17α-pregnane.

8. A compound according to claim 2 which is 1'-methyl-3β,20ξ-diacetoxy-14β,18-(epoxyethanoimino)-5α,17α-pregnane.

9. A compound according to claim 2 which is 1'-methyl-3β-methoxy.3α,9α-epoxy.11α,20ξ-dihydroxy-14β,18-(epoxyethanoimino)-5β,17α-pregnane.

10. A compound according to claim 2 which is 1'-methyl-3β-methoxy-3α,9α-epoxy-11α,20ξ-diacetoxy-14β,18-(epoxyethanoimino)-5β,17α-pregnane.

11. A compound according to claim 2 which is 1'-methyl-3α,9α-epoxy-3β,11α,20ξ-trihydroxy-14β,18-(epoxyethanoimino)-5β,17α-pregnane.

12. A compound of the Formula II (II)

wherein:

X represents chloroe, bromo or iodo, $R_1$ represents a lower alkyl group, the benzyl group or hydrogen, $R_3$ represents oxo or a ketal derived from a lower alkanediol or lower alkanols, or hydroxyl, hydroxyl esterified with a lower alkanoic acid or hydroxyl etherified with a lower alkanol or benzyl alcohol and a hydrogen atom, $R_4$ represents oxo or a ketal derived from a lower alkanediol or lower alkanols, or hydroxyl hydroxyl esterified with a lower alkanoic acid or hydroxyl etherified with a lower alkanol or benzyl alcohol and together with $R_8$ an epoxy radical, $R_5$ and $R_6$ each independently represent oxo or a ketal derived from a lower alkanediol or lower alkanols, or hydroxyl, hydroxyl esterified with a lower alkanoic acid or hydroxyl etherified with a lower alkanol or benzyl alcohol and a hydrogen atom, or two hydrogen atoms, or, when occurring at a double bond, one hydrogen atom, $R_7$ represents an α- or β-oriented hydrogen atom, $R_8$ represents an α-oriented hydrogen atom, an α-oriented hydroxyl group, or together with $R_4$ an epoxy radical, and $R_9$ represents an α- or β-oriented hydrogen atom, or hydroxyl, hydroxyl esterified with a lower alkanoic acid or hydroxyl etherified with a lower alkanol or benzyl alcohol, whereby double bonds may be present in the positions 5 or 4, when $R_4$ represents a free oxo radical, as well as 7, 9 (11) and 16 corresponding to the dotted lines with the elimination of $R_7$, $R_8$ and/or $R_9$.

13. A compound according to claim 12 which is 3β,-20-diacetoxy-14β-hydroxy-18-(N-methyl-2-chloroacetamido)-5α,17α-pregnane.

14. A compound according to claim 12 which is 3β-methoxy-3α,9α-epoxy-11α,20-diacetoxy-14β-hydroxy-18-(N-methyl-2-chloroacetamido)-5β,17α-pregnane.

* * * * *

UNITED STATES PATENT AND TRADEMARK OFFICE

CERTIFICATE OF CORRECTION

PATENT NO. : 3,869,452

DATED : March 4, 1975

INVENTOR(S) : Hansuli Wehrli et al

It is certified that error appears in the above-identified patent and that said Letters Patent are hereby corrected as shown below:

Column 26, line 59, delete "20-diacetoxy" and insert --- 20 $\xi$ -diacetoxy ---.

Column 26, line 62, delete "20-diacetoxy" and insert --- 20 $\xi$ -diacetoxy ---.

Signed and Sealed this

Twenty-ninth Day of March 1977

[SEAL]

*Attest:*

RUTH C. MASON
*Attesting Officer*

C. MARSHALL DANN
*Commissioner of Patents and Trademarks*